United States Patent
Pathangay et al.

(10) Patent No.: US 9,613,197 B2
(45) Date of Patent: Apr. 4, 2017

(54) BIOMETRIC USER AUTHENTICATION SYSTEM AND A METHOD THEREFOR

(71) Applicants: Vinod Pathangay, Bangalore (IN); Satish Prasad Rath, Bangalore (IN)

(72) Inventors: Vinod Pathangay, Bangalore (IN); Satish Prasad Rath, Bangalore (IN)

(73) Assignee: WIPRO LIMITED, Bangalore (IN)

(*) Notice: Subject to any disclaimer, the term of this patent is extended or adjusted under 35 U.S.C. 154(b) by 173 days.

(21) Appl. No.: 14/639,064

(22) Filed: Mar. 4, 2015

(65) Prior Publication Data
US 2016/0132669 A1 May 12, 2016

(30) Foreign Application Priority Data
Nov. 10, 2014 (IN) .......................... 5655/CHE/2014

(51) Int. Cl.
G06F 21/32 (2013.01)
G06N 99/00 (2010.01)

(52) U.S. Cl.
CPC .......... *G06F 21/32* (2013.01); *G06N 99/005* (2013.01)

(58) Field of Classification Search
None
See application file for complete search history.

(56) References Cited

U.S. PATENT DOCUMENTS

| | | | |
|---|---|---|---|
| 7,135,980 | B2 | 11/2006 | Moore et al. |
| 7,630,521 | B2 | 12/2009 | Kim et al. |
| 7,689,833 | B2 | 3/2010 | Lange |
| 7,773,780 | B2 | 8/2010 | Schneider et al. |
| 8,384,514 | B2 | 2/2013 | Novack et al. |
| 2007/0180047 | A1 | 8/2007 | Dong et al. |
| 2008/0104415 | A1 | 5/2008 | Palti-Wasserman et al. |
| 2010/0115610 | A1 | 5/2010 | Tredoux et al. |
| 2010/0174229 | A1 | 7/2010 | Hsu et al. |
| 2012/0313753 | A1 | 12/2012 | Miller |

(Continued)

FOREIGN PATENT DOCUMENTS

| | | |
|---|---|---|
| EP | 2712454 | 4/2014 |
| JP | 2005293209 | 10/2005 |

(Continued)

*Primary Examiner* — Amir Mehrmanesh
(74) *Attorney, Agent, or Firm* — Finnegan, Henderson, Farabow, Garrett & Dunner, LLP (57) ABSTRACT

The present disclosure relates to a method and a system for authenticating a user. In one embodiment, one or more input and target data samples extracted from a plurality of physiological and movement signals of the user are processed to train one or more regression models. In real time authentication, the input and target data samples are extracted from the plurality of physiological and activity signals and mapped with trained regression models to determine a regression error. Based on the regression error, an appropriate authentication signal is then generated and transmitted to the user. Using dynamically selected multiple input and target data samples for user authentication increases the accuracy of authentication, thereby reducing possibilities of invalid authentication. Further, the power consumed by the sensors and computation load is reduced by dynamically powering up and powering down of the one or more sensors based on their usage during the authentication process.

12 Claims, 5 Drawing Sheets

(56) References Cited

U.S. PATENT DOCUMENTS

| | | | |
|---|---|---|---|
| 2013/0227651 A1 | 8/2013 | Schultz et al. | |
| 2014/0085050 A1 | 3/2014 | Luna et al. | |
| 2014/0089672 A1 | 3/2014 | Luna et al. | |
| 2014/0089673 A1 | 3/2014 | Luna et al. | |
| 2014/0278208 A1* | 9/2014 | Donaldson | A61B 5/7264 702/141 |
| 2015/0286813 A1* | 10/2015 | Jakobsson | G06F 21/35 726/9 |
| 2015/0289820 A1* | 10/2015 | Miller | A61B 5/7221 600/300 |
| 2016/0196760 A1* | 7/2016 | Koo | G09B 19/0038 434/247 |

FOREIGN PATENT DOCUMENTS

| | | |
|---|---|---|
| JP | 201315806 | 8/2013 |
| WO | WO 2014014346 | 1/2014 |

\* cited by examiner

BIOMETRIC USER AUTHENTICATION SYSTEM AND A METHOD THEREFOR

PRIORITY CLAIM

This U.S. patent application claims priority under 35 U.S.C. §119 to: Indian Patent Application No. 5655/CHE/2014, filed Nov. 10, 2014. The aforementioned application is incorporated herein by reference in its entirety.

TECHNICAL FIELD

The present subject matter is related, in general to system and method for authenticating a user, and more particularly, but not exclusively to authentication using biometric data.

BACKGROUND

Traditional user authentication methods such as user identification and passwords still pose a significant vulnerability when accessing information systems. The problem has become more acute as Internet use grows and fraudulent strategies are launched daily in efforts to exploit the lack of adequate authentication. Biometric authentication is a known authentication technique having an advantage that there is no forgetting and forgery is difficult as compared with traditional authentication based on password or a Smart card. However, the biometric authentication mechanisms remain vulnerable in areas that involve critical operations despite such areas having very high security. There are ample possibilities that an intruder can still manage to wrongly authenticate and gain access to a prohibited area using stolen passwords, password signatures and other forged techniques.

Therefore, there is a need to provide a method and a system to authenticate user in a robust and continuous manner by using multiple parameters and dynamically selecting these parameters so as to increase authentication accuracy.

SUMMARY OF THE DISCLOSURE

One or more shortcomings of the prior art are overcome and additional advantages are provided through the present disclosure. Additional features and advantages are realized through the techniques of the present disclosure. Other embodiments and aspects of the disclosure are described in detail herein and are considered a part of the claimed disclosure.

Accordingly, the present disclosure relates to a method of authenticating a subject. The method comprises the step of receiving in real time at least a plurality of physiological and movement signals of the subject from one or more physiological and activity sensors of a wearable device. The method further comprises deriving one or more input and target data samples associated with the plurality of received physiological and movement signals. Based on the derived input and target data samples, the method determines a regression error value and transmits a signal authenticating the subject based on the comparison of the determined regression error value with a predetermined threshold regression error value.

Further, the present disclosure relates to a wearable device for authenticating a subject. The system comprises a one or more physiological and activity sensors and a processor coupled with the one or more physiological and activity sensors. The system further comprises a memory communicatively coupled to the processor, wherein the memory stores processor-executable instructions, which, on execution, cause the processor to receive in real time at least a plurality of physiological and movement signals of the subject from the one or more physiological and activity sensors. The processor is further configured to derive one or more input and target data samples associated with the plurality of received physiological and movement signals and determine a regression error value based on the derived input and target data samples. The processor is furthermore configured to transmit a signal authenticating the subject based on the comparison of the determined regression error value with a predetermined threshold regression error value.

Furthermore, the present disclosure relates to a non-transitory computer readable medium including instructions stored thereon that when processed by at least one processor cause a system to perform the act of receiving at least a plurality of physiological and movement signals of the subject from one or more physiological and activity sensors of the wearable device. Further, the instructions cause the processor to perform the acts of deriving of one or more input and target data samples associated with the plurality of received physiological and movement signals at predetermined time period and determining a regression error value based on the derived input and target data samples. The processor is further configured to perform transmitting a signal authenticating the subject based on the comparison of the determined regression error value with a predetermined threshold regression error value.

In another embodiment, the present disclosure relates to a method of authenticating a subject. The method comprising the step of receiving one or more input and target data samples from a wearable device, wherein the one or more input and target data samples are derived from a plurality of physiological and movement signals of the subject received by one or more physiological and activity sensors of the wearable device. Upon receiving the one or more input and target data samples, a regression error value is determined based on the derived input and target data samples. Further, the method comprising the step of authenticating the subject based on the comparison of the determined regression error value with a predetermined threshold regression error value.

Further, the present disclosure relates to a device for authenticating a subject. The system comprises a processor and a memory communicatively coupled to the processor, wherein the memory stores processor-executable instructions, which, on execution, cause the processor to receive, one or more input and target data samples from the wearable device, wherein the one or more input and target data samples associated with at least a plurality of physiological and movement signals of the subject received by the one or more physiological and activity sensors of the wearable device. The processor is further configured to determine a regression error value based on the received input and target data samples and authenticate the subject based on the comparison of the determined regression error value with a predetermined threshold regression error value.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

The present disclosure relates to a method, a wearable device and a system for authenticating a subject (alternatively referred to as user). In one embodiment, one or more input and target data samples are extracted from a plurality of physiological and movement signals of the user received from the one or more physiological and activity sensors of the wearable device. Based on the extracted input and target data samples, one or more regression models are trained and stored in a repository.

In real time, to authenticate the user, the input and target data samples are extracted from the plurality of physiological and activity signals received from the physiological and activity sensors. A regression error value is determined by comparing the extracted target data samples with trained target data samples. Based on the comparison, the user is authenticated and appropriate signal is indicated to the user. Using dynamically selected multiple input and target data samples to determine user authentication increases the accuracy of authentication, thereby reducing possibilities of invalid authentication. Further, the power consumed by the sensors and computation load is reduced by dynamically powering up and powering down of the one or more sensors based on their usage during the authentication process.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1:
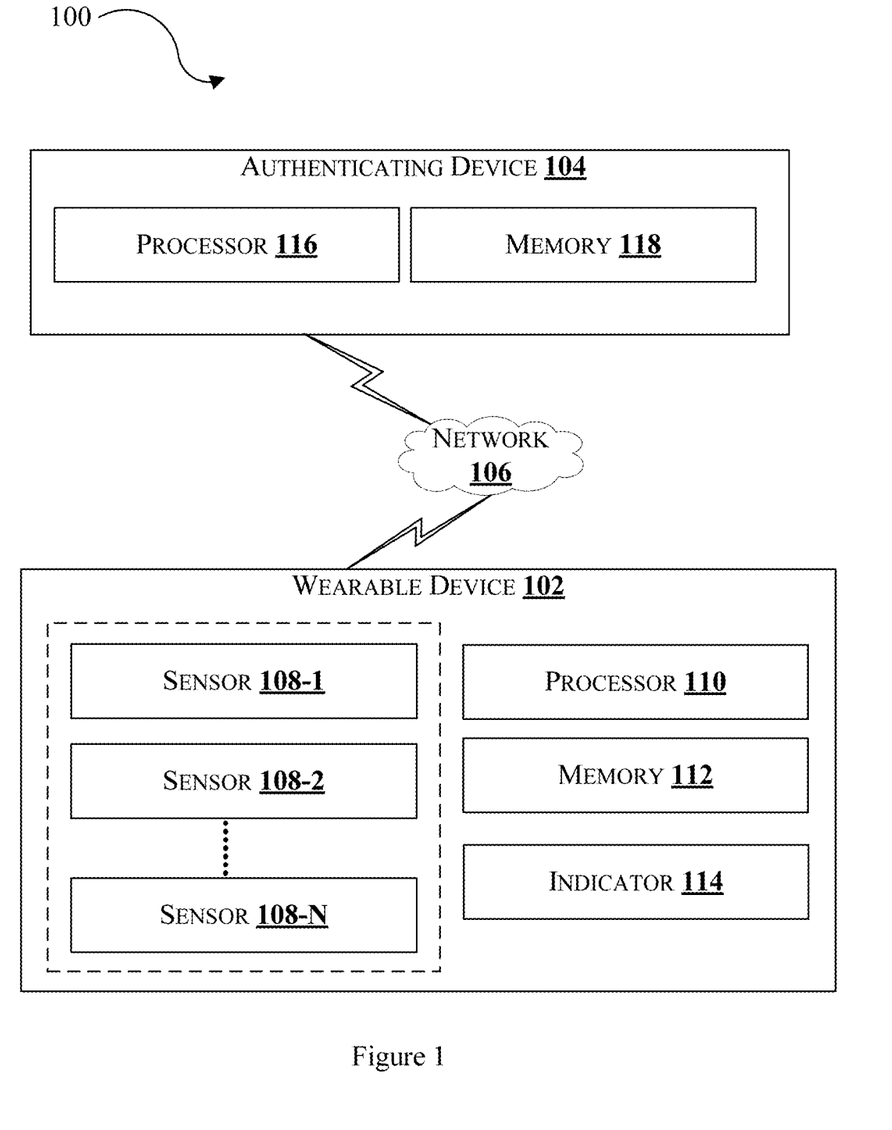
FIG. 1 illustrates architecture of system for authenticating a user in accordance with some embodiments of the present disclosure.

FIG. 1 illustrates architecture of system 100 for authenticating a user in accordance with some embodiments of the present disclosure.

As shown in FIG. 1, a system 100 comprises one or more components coupled with each other. In one implementation, the system 100 comprises a wearable device 102 communicatively coupled with an authenticating device 104 via a communication network 106.

In one embodiment, the wearable device 102 comprises one or more sensors 108-1, 108-2, . . . , 108-N (hereinafter collectively referred to as sensors 108), a processor 110, a memory 112 and an indicator 114. The wearable device 102 may be a band which is elastic and the sensors 108 may contact the skin of the forearm of the user when the band is worn. In one aspect, the sensors 108 may be preferably uniformly spaced. In another aspect, the sensors 108 may be arbitrarily spaced on the band. The wearable device 102 can be placed in varying orientation and location on the forearm. As the muscles contract in the forearm, the sensors 108 detect the corresponding electrical activity and transmit the signals. The signals may be at least plurality of physiological or activity signals associated with the user of the wearable device 102.

Physiological signals may be indicative of heart beat rate, respiration rate, or volumetric measurement of one or more organs, blood flow rate and so on. In one embodiment, the sensors 108 used to detect the physiological signals may be Electrocardiogram (ECG), pulse oximeter, Photoplethysmograh (PPG) and so on. The movement or activity signals may be determined by the sensors 108 such as for example, accelerometer, gyroscope, and one or more motion sensors including vibrometers, piezoelectric sensors or any other motion detecting sensors. In another embodiment, the sensors 108 may be any other sensors existing in the art that is capable of capturing physiological characteristics and movement of the user.

The wearable device 102 is configured to detect plurality of physiological and movement signals of the user, process the detected signals and transmit the processed signals to the authenticating device 104 for authentication. The processor 110 is configured to perform the initial signal pre-processing for example, rectification, noise reduction, filtering and so on. The authenticating device 104 is then receives the pre-processed signals transmitted by the wearable device 102, process the received signals and generate an authentication signal based on processing. In one embodiment, the authenticating device 104 comprises a processor 116 to process the received signals and generate the authentication signal. The signals received from the wearable device 102 and the processed signals are then stored in a memory 118 coupled to the processor 116. In another embodiment, the wearable device 102 is configured to detect the plurality of physiological and movement signals of the user, process the detected signals and generate an authentication signal which is then transmitted to the authenticating device 104. The processor 110 of the wearable device 102 processes the detected signals and transmits the authentication signal via an interface to the authenticating device 104. The authenticating device 104 then receives the authentication signal and accepts or denies the access of the user based on the received authentication signal.

Figure 2:
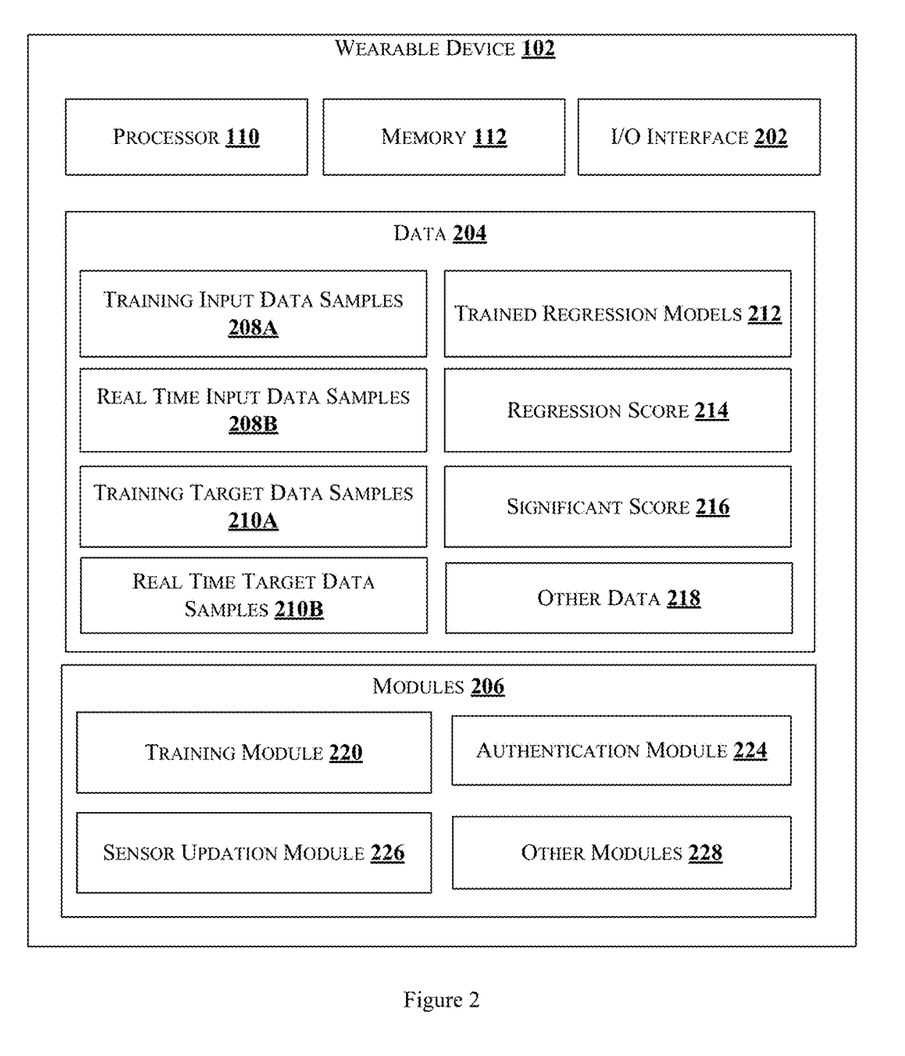
FIG. 2 illustrates a block diagram of the wearable device for authenticating the user using the biometric parameters in accordance with some embodiments of the present disclosure.

The wearable device is one of the possible variations of the wearable device 102 described in greater details below with reference to FIG. 2. In one implementation, the exemplary wearable device 102, as shown in FIG. 2, includes a central processing unit ("CPU" or "processor") 110, the memory 112 and an I/O interface 202. The I/O interface 202 is coupled with the processor 110 and an I/O device. The I/O device is configured to receive inputs via the I/O interface 202 and transmit outputs for displaying in the I/O device via the I/O interface 202.

The wearable device 102 further comprises data 204 and modules 206. In one implementation, the data 204 and the modules 206 may be stored within the memory 112. In one example, the data 204 may include training input data samples 208A, training target data samples 210A, real time input data samples 208B, real time target data samples 210B, trained regression models 212, regression score 214, significant score 216 and other data 218. In one embodiment, the data 204 may be stored in the memory 112 in the form of various data structures. Additionally, the aforementioned data can be organized using data models, such as relational or hierarchical data models. The other data 218 may be used to store data, including temporary data and temporary files, generated by the modules 206 for performing the various functions of the wearable device 102.

The modules 206 may include, for example, a training module 220, an authentication module 222, and a sensor updation module 224. The modules 206 may also comprise other modules 228 to perform various miscellaneous functionalities of the wearable device 102. It will be appreciated that such aforementioned modules may be represented as a single module or a combination of different modules.

In operation, one or more data samples of corresponding physiological and movement signals are trained in one or more regression models. The models then receive real time data samples, use the trained regression models 212 to match the received real time samples with previously determined samples and identify an authorized user based on matching. To train one or more regression models, the training module 220 receives the plurality of physiological and activity signals associated with the user from the sensors 108 and process the received signals to obtain one or more trained regression models 212. In one embodiment, the training module 220 receives at least plurality of time synchronized physiological and movement signals of the user from the sensors 108. The training module 220 may also receive all signals or at least a subset of the signals from the sensors 108.

Further, the training module 220 derives one or more training input and target data samples 208A, 210A associated with the plurality of received physiological and movement signals. The training module 220 extracts one or more training input data samples 208A associated with at least a first subset of the plurality of received physiological and movement signals. The training module 220 further extracts one or more training target data samples 210A associated with at least a second subset of the plurality of received physiological and movement signals. Both the first and the second subset comprise the plurality of physiological and movement signals. In one embodiment, the second subset comprises plurality of physiological and movement signals not present in the first subset of signals. The training input and the target data samples are obtained at predetermined time period, say for example at least 30 seconds.

Upon deriving the one or more training input and target data samples 208A, 210A, the training module 220 generates one or more arbitrary combinations of input and target data samples to train one or more regression models. In one embodiment, the training module 220 generates the one or more arbitrary combinations of input and target data samples by randomly selecting combinations of training input and target data samples 208 A, 210 A from the one or more derived training input and target data samples 208 A, 210 A. Based on the randomly selected combinations of the training input and target data samples 208 A, 210 A, the training module 220 trains one or more regression models and generates one or more trained regression models 212 associated with the user. The training of the one or more regression models includes determination of correlation between the arbitrary combinations of the training input and the target data samples 208 A, 210 A. The training module 220 may implement training of the one or more regression models using Support Vector Machine (SVM) or any other machine learning techniques known in the art.

Upon generating one or more trained regression models 212, the training module 220 determines the training progress and indicates the determined training progress to the user using the indicator 114 that comprises for example, one or more colored LEDs. In one embodiment, the training module 220 determines the training progress based on a predetermined training threshold value and a regression error for each of the trained regression models 212. In one embodiment, the training module 220 determines regression error for 'K' number of regression models, if there are 'N' number of input and target data samples are derived, as illustrated in the below equation (1):

$$K = {}^N C_2 \quad (1)$$

The training progress 'P' at time 't' is determined, based on the predetermined training threshold value and the regression error determined for each of the trained regression models, as illustrated in equation (2):

$$P(t) = \frac{1}{K} \sum_{t=1}^{N} \eta(t) \quad (2)$$

The training module 220 further compares the determined training progress 'P' with the predetermined training threshold value 'T' to determine the completion of training. If the training progress value 'P' is determined to be greater than or equal to the training threshold 'T', then the training module 220 determines that the training is complete and further determines the percentage of training progress as illustrated in equation (3) below:

Percentage of training progress=$P/T*100$ (3)

Further, the indicator 114 displays the training progress to the user by illuminating one or more colored LEDs. For example, if the training is complete then the illuminator 114 illuminates green colored LEDs, otherwise red colored LEDs are illuminated.

Upon completion of training, the authentication process begins when the user is required to access one or more secured resources in real time. In one embodiment, the authentication module 224 is configured to receive a plurality of physiological and movement signals in real time and process the received signals to obtain one or more input and target data samples associated with the plurality of received physiological and movement signals. The authentication module 224 extracts one or more real time input data samples 208B associated with at least a first subset of the plurality of received physiological and movement signals. The authentication module 224 further extracts one or more real time target data samples 210B associated with at least a second subset of the plurality of received physiological and movement signals. Both the first and the second subset comprise the plurality of physiological and movement signals. In one embodiment, the second subset comprise plurality of physiological and movement signals not existing in the first subset of signals. The input and the target data samples are obtained at predetermined time period, say for example at least 30 seconds.

Upon deriving the one or more real time input and target data samples 208B, 210B, the authentication module 224 determines a regression error value based on the derived real time input and target data samples 208B, 210B. In one embodiment, the authentication module 224 maps the real time input data samples 208B onto the one or more trained regression models associated with the user and identify one or more mapping regression models. The authentication module 224 then obtains the one or more training target data samples 210A corresponding to the mapping regression models that are identified. The authentication module 224 further compares the one or more training target data samples 210A with the derived real time target data samples 210B and determines the regression error.

The authentication module 224 further determines authentication of the user based on regression error thus determined. In one embodiment, the authentication module 224 compares the regression error with a predetermined regression error threshold value and generates the authentication signal based on the comparison. For example, if the regression error is determined to be lesser than the predetermined regression error threshold value, then the authentication module 224 generates an accept authentication signal to allow the access of the user to the respective resources. On the other hand, if the regression error is determined to be greater than or equal to the predetermined regression error threshold value, then the authentication module 224 generates a reject authentication signal to deny the access of the user. The authentication module 224 then transmits the generated authentication signal to the user.

The wearable device 102 is further configured to determine a significant score for the one or more regression models. In one embodiment, the sensor updation module 226 determines a significant score for each of the regression models based on the corresponding regression error values. The regression models may be the regression models 'i' that are mapped and identified during both successful and unsuccessful authentication processes. The significant score is determined based on regression score of one or more regression models of both authenticated and impostor users. As illustrated below in equation (4), the significant score is determined as:

$$S(i) = \log\left(\frac{G}{1+F}\right) = (1+F)/G \quad (4)$$

wherein 'G' is a first regression score of the one or more regression models associated with authenticated users and 'F' is a second regression score of the one or more regression models associated with fraud or impostor users. The regression score is the inverse of the regression error.

Upon determining the significant score of the one or more regression models, the sensor updation module 226 arranges the significant score of the one or more regression models in descending order for example. The sensor updation module 226 selects one or more regression models having maximum significant score and dynamically performs at least one of enabling or disabling the sensors 108 based on the usage. In one embodiment, the sensor updation module 226 dynamically enables or disables the sensors 108 based on the usage with the selected regression models. Dynamic enablement or disablement of the sensors 108 also result in saving power consumption and computing load by the processor as only the relevant subset of sensors and corresponding signals are used in authentication instead of computing on all signals.

Figure 3:
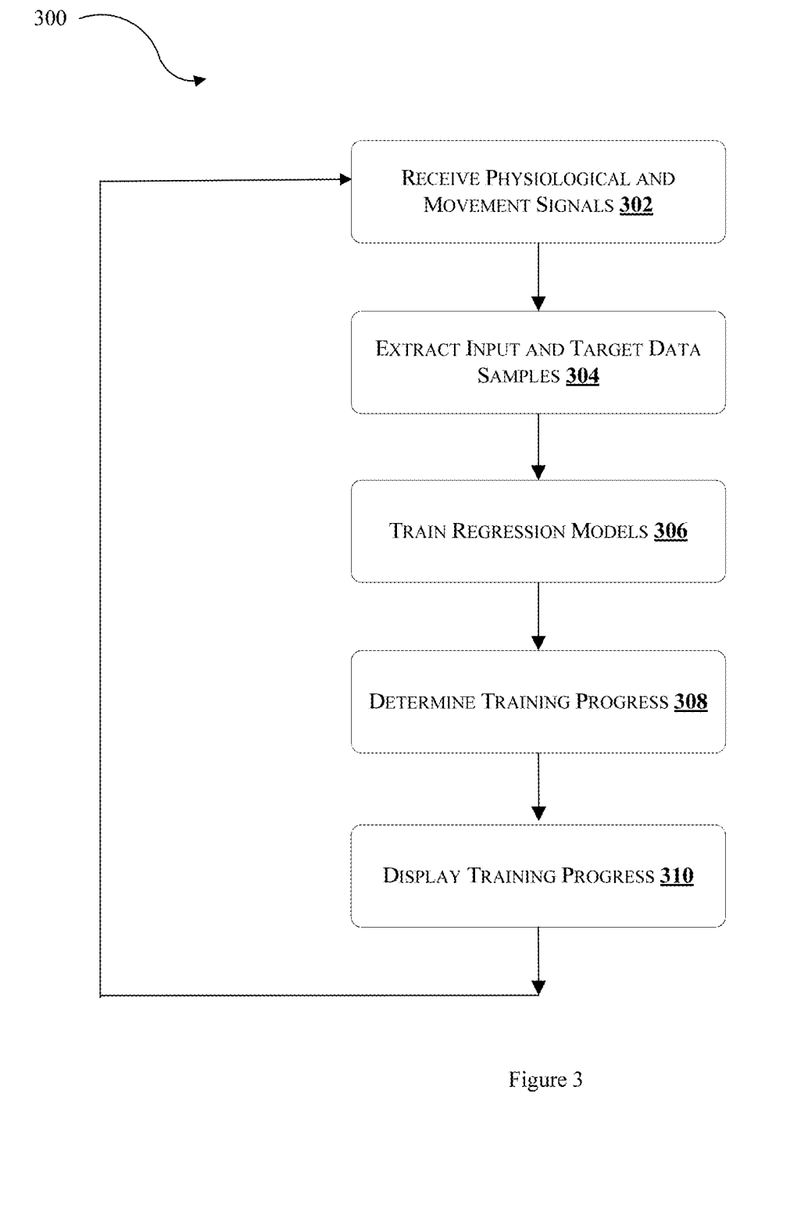
FIG. 3 illustrates a flowchart of a method of training regression models associated with the user in accordance with some embodiments of the present disclosure.

FIG. 3 illustrates a flowchart of method of training regression models associated with the user in accordance with an embodiment of the present disclosure.

As illustrated in FIG. 3, the method 300 comprises one or more blocks implemented by the processor 110 for training one or more regression models associated with the user. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method 300. Additionally, individual blocks may be deleted from the method 300 without departing from the spirit and scope of the subject matter described herein. Furthermore, the method 300 can be implemented in any suitable hardware, software, firmware, or combination thereof.

At block 302, receive physiological and movement signals. In one embodiment, the training module 220 receives the plurality of physiological and activity signals associated with the user from the sensors 108 and process the received signals to obtain one or more trained regression models. In one embodiment, the training module 220 receives at least plurality of time synchronized physiological and movement signals of the user from the sensors 108. The training module 220 may also receive all signals or at least a subset of the signals from the sensors 108.

At block 304, extract input and target data samples. In one embodiment, the training module 220 derives one or more training input and target data samples 208A, 210A associated with the plurality of received physiological and movement signals. The training module 220 extracts one or more training input data samples 208A associated with at least a first subset of the plurality of received physiological and movement signals. The training module 220 further extracts one or more training target data samples 210A associated with at least a second subset of the plurality of received physiological and movement signals. Both the first and the second subset comprise the plurality of physiological and movement signals. In one embodiment, the second subset comprises plurality of physiological and movement signals not present in the first subset of signals. The training input and the target data samples are obtained at predetermined time period.

At block 306, train regression models. Upon deriving the one or more training input and target data samples 208A, 210A, the training module 220 generates one or more arbitrary combinations of input and target data samples to train one or more regression models. In one embodiment, the training module 220 generates the one or more arbitrary combinations of input and target data samples by randomly selecting combinations of training input and target data samples 208 A, 210 A from the one or more derived training input and target data samples 208 A, 210 A. Based on the randomly selected combinations of the training input and target data samples 208 A, 210 A, the training module 220 trains one or more regression models and generates one or more trained regression models associated with the user. The training of the one or more regression models includes determination of correlation between the arbitrary combinations of the training input and the target data samples 208 A, 210 A. The training module 220 may implement training of the one or more regression models using Support Vector Machine (SVM) or any other machine learning techniques known in the art.

At block 308, determine training progress. In one implementation, the training module 220 determines the training progress based on a predetermined training threshold value and a regression error for each of the trained regression models. In one embodiment, the training module 220 determines regression error for 'K' number of regression models, if there is 'N' number of input and target data samples are derived. The training progress 'P' at time 't' is determined, based on the predetermined training threshold value and the regression error determined for each of the trained regression models. The training module 220 further compares the determined training progress 'P' with the predetermined training threshold value 'T' to determine the completion of training. If the training progress value 'P' is determined to be greater than or equal to the training threshold 'T', then the training module 220 determines that the training is complete and further determined the percentage of training progress.

At block 310, display the training progress. In one embodiment, the indicator 114 displays the training progress to the user by illuminating one or more colored LEDs. For example, if the training is complete then the illuminator 114 illuminates green colored LEDs, otherwise red colored LEDs are illuminated.

Figure 4:
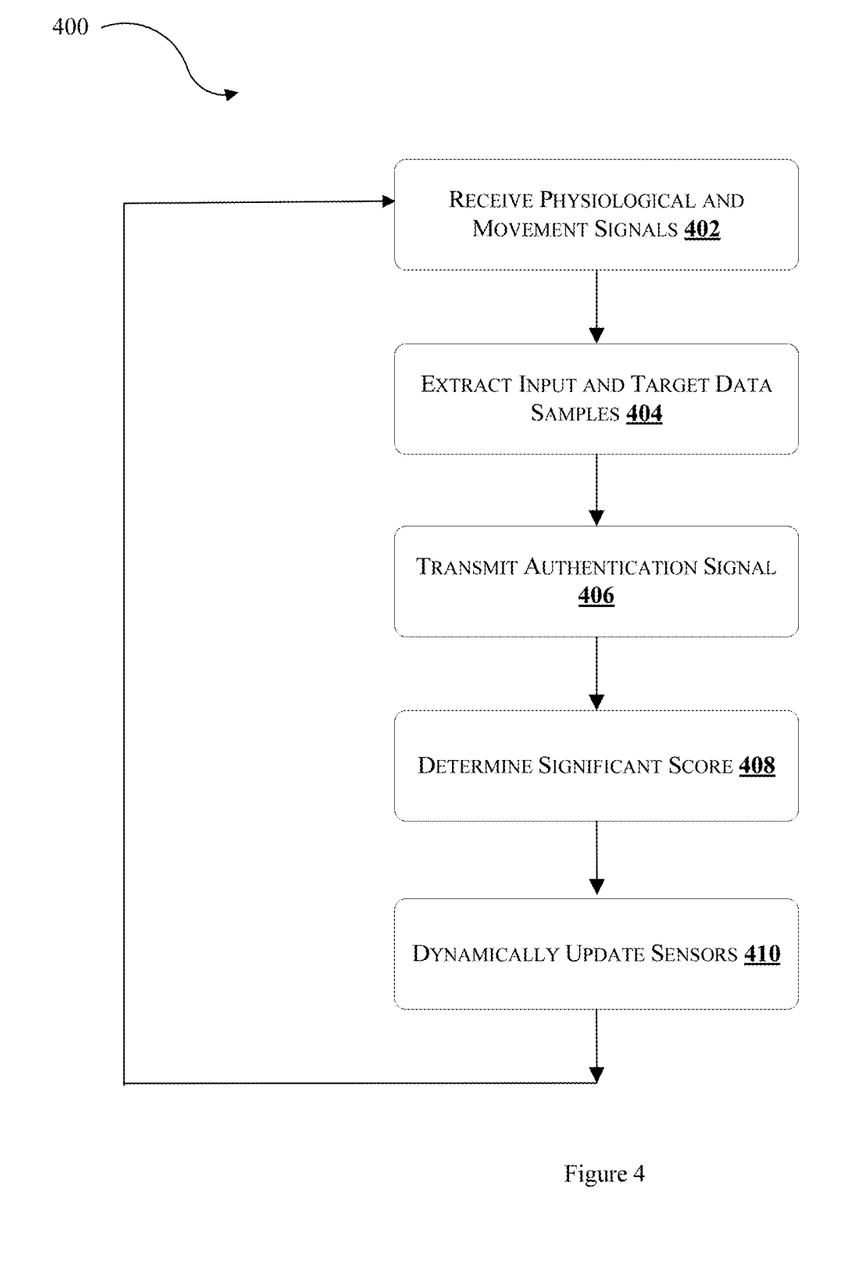
FIG. 4 illustrates a flowchart of a method of authenticating the user in accordance with some embodiments of the present disclosure.

FIG. 4 illustrates a flowchart of method of training regression models associated with the user in accordance with an embodiment of the present disclosure.

As illustrated in FIG. 4, the method 400 comprises one or more blocks implemented by the processor 110 for authenticating the user. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method 400. Additionally, individual blocks may be deleted from the method 400 without departing from the spirit and scope of the subject matter described herein. Furthermore, the method 400 can be implemented in any suitable hardware, software, firmware, or combination thereof.

Upon completion of training, the authentication process begins when the user is required to access one or more secured resources in real time.

At block 402, receive physiological and movement signals. In one embodiment, the authentication module 224 is configured to receive a plurality of physiological and movement signals in real time and process the received signals to obtain one or more input and target data samples associated with the plurality of received physiological and movement signals.

At block 404, extract input and target data samples. In one embodiment, the authentication module 224 extracts one or more real time input data samples 208B associated with at least a first subset of the plurality of received physiological and movement signals. The authentication module 224 further extracts one or more real time target data samples 210B associated with at least a second subset of the plurality of received physiological and movement signals. Both the first and the second subset comprise the plurality of physiological and movement signals. In one embodiment, the second subset comprise plurality of physiological and movement signals not existing in the first subset of signals. The input and the target data samples are obtained at predetermined time period.

At block 406, transmit authentication signal. Upon deriving the one or more real time input and target data samples 208B, 210B, the authentication module 224 determines a regression error value based on the derived real time input and target data samples 208B, 210B. In one embodiment, the authentication module 224 maps the real time input data samples 208B onto the one or more trained regression models associated with the user and identify one or more mapping regression models. The authentication module 224 then obtains the one or more training target data samples 210A corresponding to the mapping regression models that are identified. The authentication module 224 further compares the one or more training target data samples 210A with the derived real time target data samples 210B and determines the regression error.

The authentication module 224 further determines authentication of the user based on regression error thus determined. In one embodiment, the authentication module 224 compares the regression error with a predetermined regression error threshold value and generates the authentication signal based on the comparison. For example, if the regression error is determined to be lesser than the predetermined regression error threshold value, then the authentication module 224 generates an accept authentication signal to allow the access of the user to the respective resources. On the other hand, if the regression error is determined to be greater than or equal to the predetermined regression error threshold value, then the authentication module 224 generates a reject authentication signal to deny the access of the user. The authentication module 224 then transmits the generated authentication signal to the user.

At block 408, determine significant score. In one implementation, the wearable device 102 is further configured to determine a significant score for the one or more regression models. In one embodiment, the sensor updation module 226 determines a significant score for each of the regression models based on the corresponding regression error values. The regression models may be the regression models 'i' that are mapped and identified during both successful and unsuccessful authentication processes. The significant score is determined based on a first regression score of one or more regression models of authenticated users and on a second regression score of one or more regression models of impostor users.

At block 410, dynamically update sensors. In one embodiment, upon determining the significant score of the one or more regression models, the sensor updation module 226 arranges the significant score of the one or more regression models in descending order for example. The sensor updation module 226 selects one or more regression models having maximum significant score and dynamically performs at least one of enabling or disabling the sensors 108 based on the usage. In one embodiment, the sensor updation module 226 dynamically enables or disables the sensors 108 based on the usage with the selected regression models. Dynamic enablement or disablement of the sensors 108 also result in saving power consumption and computing load by the processor as only the relevant subset of sensors and corresponding signals are used in authentication instead of computing on all signals.

Figure 5:
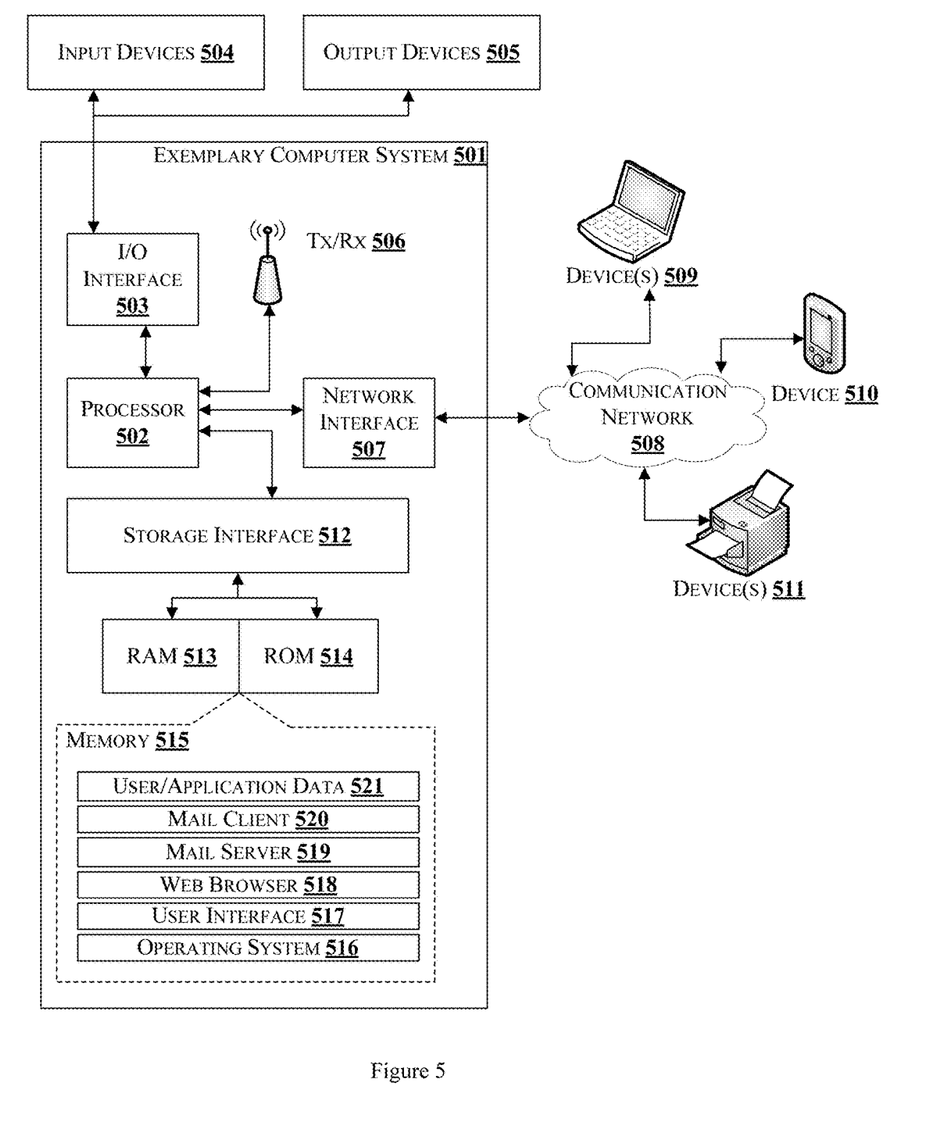
FIG. 5 is a block diagram of an exemplary computer system for implementing embodiments consistent with the present disclosure.

FIG. 5 is a block diagram of an exemplary computer system for implementing embodiments consistent with the present disclosure.

Variations of computer system 501 may be used for implementing all the computing systems that may be utilized to implement the features of the present disclosure. Computer system 501 may comprise a central processing unit ("CPU" or "processor") 502. Processor 502 may comprise at least one data processor for executing program components for executing user- or system-generated requests. The processor may include specialized processing units such as integrated system (bus) controllers, memory management control units, floating point units, graphics processing units, digital signal processing units, etc. The processor 502 may include a microprocessor, such as AMD Athlon, Duron or Opteron, ARM's application, embedded or secure processors, IBM PowerPC, Intel's Core, Itanium, Xeon, Celeron or other line of processors, etc. The processor 502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 505 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface 507 may employ connection protocols including, without limitation, direct connect, Ethernet (e.g., twisted pair 10/40/400 Base T), transmission control protocol/internet protocol (TCP/IP), token ring, IEEE 802.11a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 509, 510, and 511. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 501 may itself embody one or more of these devices.

In some embodiments, the processor 502 may be disposed in communication with one or more memory devices (e.g., RAM 513, ROM 5Error! Reference source not found.14, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory 515 may store a collection of program or database components, including, without limitation, an operating system 5Error! Reference source not found.16, user interface application 5Error! Reference source not found.17, web browser 518, mail server 519, mail client 520, user/application data 521 (e.g., any data variables or data records discussed in this disclosure), etc. The operating system 516 may facilitate resource management and operation of the computer system 501. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 501 may implement a web browser 518 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 501 may implement a mail server 519 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 501 may implement a mail client 520 stored program component. The mail client may be a mail viewing application, such as Apple Mail, Microsoft Entourage, Microsoft Outlook, Mozilla Thunderbird, etc.

In some embodiments, computer system 501 may store user/application data 521, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As described above, the modules 206, amongst other things, include routines, programs, objects, components, and data structures, which perform particular tasks or implement particular abstract data types. The modules 206 may also be implemented as, signal processor(s), state machine(s), logic circuitries, and/or any other device or component that manipulate signals based on operational instructions. Further, the modules 206 can be implemented by one or more hardware components, by computer-readable instructions executed by a processing unit, or by a combination thereof.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., are non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:
1. A method of authenticating a subject, the method comprising:
  receiving in real time, by a processor of a wearable device, at least a plurality of physiological and movement signals of the subject from one or more physiological and activity sensors of the wearable device;
  deriving, by the processor, one or more input and target data samples associated with the plurality of received physiological and movement signals;
  determining, by the processor, a regression error value based on the derived input and target data samples;
  transmitting, by the processor, a signal authenticating the subject based on the comparison of the determined regression error value with a predetermined threshold regression error value;
  receiving at least a plurality of physiological and movement signals of the subject from the one or more physiological and activity sensors;
  deriving one or more input and target data samples associated with the plurality of received physiological and movement signals;

generating one or more combinations of input and target data samples by randomly selecting input and target data sample from the corresponding derived input and target data samples; and training one or more regression models based on the one or more generated combinations of the input and target data samples to generate one or more trained regression models associated with the subject;

determining a model regression error value for each of the trained regression models;

calculating a training progress value at a time based on the determined model regression error value and a predetermined training threshold value; and displaying the determined training progress value.

2. The method as claimed in claim 1, wherein deriving the one or more input and target data samples comprising:

extracting, at a predetermined time period, input data samples associated with at least a first subset of the plurality of received physiological and movement signals; and extracting, at a predetermined time period, target data samples associated with at least a second subset of the plurality of received physiological and movement signal, wherein the first subset and the second subset comprises the plurality of physiological and movement signals.

3. The method as claimed in claim 1, wherein determining the regression error value comprising:

mapping the derived input data samples onto one or more trained regression models associated with the subject;

obtaining the one or more trained target data samples corresponding to the trained regression models that are mapped;

comparing the one or more trained target data samples with the derived target data samples; and determining the regression error value based on comparison.

4. The method as claimed in claims 1 and 2, further comprising:

determining a first regression score of each of the trained regression models associated with an authorized subject based on the corresponding regression error of each trained regression model associated with the authorized subject;

determining a second regression score of each of the trained regression models associated with an unauthorized subject based on the corresponding regression error of each trained regression model associated with the unauthorized subject;

determining a significant score for each of the trained regression models based on the first and the second regression scores thus determined;

selecting one or more trained regression models having maximum significant score; and dynamically performing at least one of enabling and disabling the one or more physiological and activity sensors based on the usage within the selected trained regression models.

5. A wearable device for authenticating a subject, said device comprising:

one or more one or more physiological and activity sensors;

a processor coupled with the one or more physiological and activity sensors; and a memory communicatively coupled to the processor, wherein the memory stores processor-executable instructions, which, on execution, cause the processor to:

receive in real time at least a plurality of physiological and movement signals of the subject from the one or more physiological and activity sensors;

derive one or more input and target data samples associated with the plurality of received physiological and movement signals;

determine a regression error value based on the derived input and target data samples;

transmit a signal authenticating the subject based on the comparison of the determined regression error value with a predetermined threshold regression error value;

receive at least a plurality of physiological and movement signals of the subject from the one or more physiological and activity sensors;

derive one or more input and target data samples associated with the plurality of received physiological and movement signals;

generate one or more combinations of input and target data samples by randomly selecting input and target data sample from the corresponding derived input and target data samples; and train one or more regression models based on the one or more generated combinations of the input and target data samples to generate one or more trained regression models associated with the subject;

determine a model regression error value for each of the trained regression models;

calculate a training progress value at a time based on the determined model regression error value and a predetermined training threshold value; and display the determined training progress value.

6. The wearable device as claimed in claim 5, wherein the instructions, on execution, further cause the processor to derive the one or more input and target data samples by:

extracting, at a predetermined time period, input data samples associated with at least a first subset of the plurality of received physiological and movement signals; and extracting, at a predetermined time period, target data samples associated with at least a second subset of the plurality of received physiological and movement signal, wherein the first subset and the second subset comprises the plurality of physiological and movement signals.

7. The wearable device as claimed in claim 5, wherein the instructions, on execution, further cause the processor to determine the regression error value by:

mapping the derived input data samples onto one or more trained regression models associated with the subject;

obtaining the one or more trained target data samples corresponding to the trained regression models that are mapped;

comparing the one or more trained target data samples with the derived target data samples; and determining the regression error value based on the comparison.

8. The wearable device as claimed in claim 5, wherein the instructions, on execution, further cause the processor to:

determine a first regression score of each of the trained regression models associated with an authorized subject based on the corresponding regression error of each trained regression model associated with the authorized subject;

determine a second regression score of each of the trained regression models associated with an unauthorized subject based on the corresponding regression error of each trained regression model associated with the unauthorized subject;

determine a significant score for each of the trained regression models based on the first and the second regression scores thus determined;

select one or more trained regression models having maximum significant score; and dynamically perform at least one of enable and disable of the one or more physiological and activity sensors based on the usage within the selected trained regression models.

9. A non-transitory computer readable medium including instructions stored thereon that when processed by at least one processor cause a system to perform acts of:

receiving at least a plurality of physiological and movement signals of the subject from one or more physiological and activity sensors of the wearable device;

deriving one or more input and target data samples associated with the plurality of received physiological and movement signals at predetermined time period;

determining a regression error value based on the derived input and target data samples;

transmitting a signal authenticating the subject based on the comparison of the determined regression error value with a predetermined threshold regression error value;

receiving at least a plurality of physiological and movement signals of the subject from the one or more physiological and activity sensors;

deriving one or more input and target data samples associated with the plurality of received physiological and movement signals;

generating one or more combinations of input and target data samples by randomly selecting input and target data sample from the corresponding derived input and target data samples; and training one or more regression models based on the one or more generated combinations of the input and target data samples to generate one or more trained regression models associated with the subject;

determining a model regression error value for each of the trained regression models;

calculating a training progress value at a time based on the determined model regression error value and a predetermined training threshold value; and displaying the determined training progress value.

10. The medium as claimed in claim 9, wherein the instructions, on execution, further cause the at least one processor to derive the one or more input and target data samples by:

extracting, at a predetermined time period, input data samples associated with at least a first subset of the plurality of received physiological and movement signals; and extracting, at a predetermined time period, target data samples associated with at least a second subset of the plurality of received physiological and movement signal, wherein the first subset and the second subset comprises the plurality of physiological and movement signals.

11. The medium as claimed in claim 9, wherein the instructions, on execution, further cause the at least one processor to:

map the derived input data samples onto one or more trained regression models associated with the subject;

obtain the one or more trained target data samples corresponding to the trained regression models that are mapped;

compare the one or more trained target data samples with the derived target data samples; and determine the regression error value based on comparison.

12. The medium as claimed in claim 9, wherein the instructions, on execution, further cause the at least one processor to:

determine a first regression score of each of the trained regression models associated with an authorized subject based on the corresponding regression error of each trained regression model associated with the authorized subject;

determine a second regression score of each of the trained regression models associated with an unauthorized subject based on the corresponding regression error of each trained regression model associated with the unauthorized subject;

determine a significant score for each of the trained regression models based on the first and the second regression scores thus determined;

select one or more trained regression models having maximum significant score; and dynamically perform at least one of enable and disable of the one or more physiological and activity sensors based on the usage within the selected trained regression models.

* * * * *

UNITED STATES PATENT AND TRADEMARK OFFICE
CERTIFICATE OF CORRECTION

| | |
|---|---|
| PATENT NO. | : 9,613,197 B2 |
| APPLICATION NO. | : 14/639064 |
| DATED | : April 4, 2017 |
| INVENTOR(S) | : Vinod Pathangay et al. |

It is certified that error appears in the above-identified patent and that said Letters Patent is hereby corrected as shown below:

In the Claims

Claim 4, Column 15, Line 40, "The method as claimed in claims 1 and 2," should read -- The method as claimed in claim 1, --.

Signed and Sealed this
Thirtieth Day of May, 2017

Michelle K. Lee
*Director of the United States Patent and Trademark Office*